(12) United States Patent
Leonhard et al.

(10) Patent No.: US 10,401,988 B2
(45) Date of Patent: *Sep. 3, 2019

(54) TOUCH SCREEN PROTECTOR

(71) Applicant: AEVOE CORP., Sunnyvale, CA (US)

(72) Inventors: Michael Leonhard, Santa Clara, CA (US); Jonathan Lin, Mountainview, CA (US); Steven Huang, Taipei (TW)

(73) Assignee: AEVOE CORP., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/078,245

(22) Filed: Nov. 12, 2013

(65) Prior Publication Data

US 2014/0072749 A1 Mar. 13, 2014

Related U.S. Application Data

(63) Continuation of application No. 13/352,196, filed on Jan. 17, 2012, now Pat. No. 9,582,039, which is a (Continued)

(51) Int. Cl.
*G06F 1/16* (2006.01)
*G06F 3/041* (2006.01)

(52) U.S. Cl.
CPC ............ *G06F 3/041* (2013.01); *G06F 1/1637* (2013.01); *G06F 2200/1633* (2013.01); (Continued)

(58) Field of Classification Search
CPC .................. G06F 1/1637; G06F 3/041; G06F 2200/1633; G06F 2200/1634; (Continued)

(56) References Cited

U.S. PATENT DOCUMENTS 3,948,662 A 4/1976 Alston, Jr. et al.
3,950,580 A 4/1976 Boudet
(Continued)

FOREIGN PATENT DOCUMENTS

CN 1522024 A 8/2004
CN 201203726 Y 3/2009
(Continued)

OTHER PUBLICATIONS

Examination Report; dated Jun. 12, 2015; UK Application No. GB1200651.6.
(Continued)

*Primary Examiner* — Patricia L. Nordmeyer
(74) *Attorney, Agent, or Firm* — The Webb Law Firm

(57) ABSTRACT

The invention relates to a touch screen protector for a hand held electronic device having a front face that includes a touch screen portion and a non-functional band. The touch screen protector of the invention comprises a plastic film having front and back sides, an outer perimeter that corresponds to that of the device, and a transparent window; a spacer provided along the outer perimeter of the plastic film surrounding the transparent window, having a thickness sufficient to space the plastic film near but not in contact with the touch screen portion; an exposed adhesive for removably mounting the protector upon the outer perimeter of the front face to form an enclosed air space between the transparent window of the plastic film, the spacer and the touch screen portion of the device; and a joining adhesive for adhering the spacer to the back side of the plastic film.

22 Claims, 2 Drawing Sheets

Related U.S. Application Data continuation-in-part of application No. PCT/US2011/051344, filed on Sep. 13, 2011, which is a continuation of application No. 13/160,404, filed on Jun. 14, 2011, now Pat. No. 8,044,942.

(60) Provisional application No. 61/433,789, filed on Jan. 18, 2011.

(52) U.S. Cl.
CPC ..... G06F 2200/1634 (2013.01); Y10T 428/14 (2015.01); Y10T 428/1471 (2015.01); Y10T 428/2495 (2015.01); Y10T 428/24273 (2015.01); Y10T 428/24322 (2015.01); Y10T 428/24777 (2015.01); Y10T 428/24942 (2015.01)

(58) Field of Classification Search
CPC ........... Y10T 428/24273; Y10T 428/14; Y10T 428/2495; Y10T 428/24942; Y10T 428/24777; Y10T 428/1471; Y10T 428/24322

See application file for complete search history.

(56) References Cited

U.S. PATENT DOCUMENTS

| | | | |
|---|---|---|---|
| 4,889,754 A | 12/1989 | Vargas | |
| 4,907,090 A | 3/1990 | Ananian | |
| 5,132,588 A | 7/1992 | Warman | |
| 5,160,315 A | 11/1992 | Heinecke et al. | |
| 5,486,883 A | 1/1996 | Candido | |
| 5,668,612 A | 9/1997 | Hung | |
| 5,937,596 A | 8/1999 | Leeuwenburgh et al. | |
| 6,104,530 A | 8/2000 | Okamura et al. | |
| 6,250,765 B1 | 6/2001 | Murakami | |
| 6,469,752 B1 | 10/2002 | Ishikawa et al. | |
| 6,536,589 B2 | 3/2003 | Chang | |
| 6,555,235 B1 | 4/2003 | Aufderheide et al. | |
| 6,559,902 B1 | 5/2003 | Kusuda et al. | |
| 6,592,950 B1 | 7/2003 | Toshima et al. | |
| 6,614,423 B1 | 9/2003 | Wong et al. | |
| 6,667,738 B2* | 12/2003 | Murphy | 345/173 |
| 6,721,019 B2 | 4/2004 | Kono et al. | |
| 6,750,922 B1 | 6/2004 | Benning | |
| 6,777,055 B2 | 8/2004 | Janssen et al. | |
| 6,800,378 B2 | 10/2004 | Hawa et al. | |
| 6,864,882 B2 | 3/2005 | Newton | |
| 6,879,319 B2 | 3/2005 | Cok | |
| 6,995,976 B2 | 2/2006 | Richardson | |
| 7,034,877 B2 | 4/2006 | Schmidt | |
| 7,070,837 B2 | 7/2006 | Ross | |
| 7,226,176 B1 | 6/2007 | Huang | |
| 7,495,895 B2 | 2/2009 | Carnevali | |
| 8,044,942 B1 | 10/2011 | Leonhard et al. | |
| 8,974,620 B2 | 3/2015 | Wilson | |
| 9,104,256 B2 | 8/2015 | Wilson et al. | |
| 9,128,545 B2 | 9/2015 | Wilson et al. | |
| 9,274,625 B2 | 3/2016 | Wilson et al. | |
| 9,283,731 B2 | 3/2016 | Leonhard et al. | |
| 9,471,163 B2 | 10/2016 | Wilson et al. | |
| 2002/0101411 A1 | 8/2002 | Chang | |
| 2002/0114934 A1* | 8/2002 | Liu et al. | 428/212 |
| 2002/0122925 A1 | 9/2002 | Liu et al. | |
| 2002/0154099 A1 | 10/2002 | Oh | |
| 2002/0195910 A1 | 12/2002 | Hus et al. | |
| 2003/0012936 A1 | 1/2003 | Draheim et al. | |
| 2003/0087054 A1* | 5/2003 | Janssen et al. | 428/40.1 |
| 2003/0110613 A1 | 6/2003 | Ross | |
| 2004/0004605 A1 | 1/2004 | David | |
| 2004/0109096 A1* | 6/2004 | Anderson et al. | 348/832 |
| 2004/0209007 A1 | 10/2004 | Satake et al. | |
| 2004/0227722 A1 | 11/2004 | Friberg et al. | |
| 2004/0246386 A1 | 12/2004 | Thomas et al. | |
| 2006/0114245 A1 | 6/2006 | Masters et al. | |
| 2007/0181456 A1 | 8/2007 | Kusuda et al. | |
| 2007/0212508 A1 | 9/2007 | Mase | |
| 2008/0030631 A1 | 2/2008 | Gallagher | |
| 2008/0055258 A1 | 3/2008 | Sauers | |
| 2008/0062147 A1 | 3/2008 | Hotelling et al. | |
| 2008/0302456 A1 | 12/2008 | Cook | |
| 2010/0026646 A1 | 2/2010 | Xiao et al. | |
| 2010/0092713 A1 | 4/2010 | Bullard et al. | |
| 2010/0102197 A1 | 4/2010 | McIntyre | |
| 2010/0164836 A1 | 7/2010 | Liberatore | |
| 2010/0208352 A1 | 8/2010 | Onozawa et al. | |
| 2010/0238119 A1 | 9/2010 | Dubrovsky et al. | |
| 2010/0245273 A1 | 9/2010 | Hwang et al. | |
| 2010/0270189 A1 | 10/2010 | Pedersen, II et al. | |
| 2011/0157056 A1 | 6/2011 | Karpfinger | |
| 2011/0279383 A1 | 11/2011 | Wilson et al. | |
| 2011/0285932 A1 | 11/2011 | Park | |
| 2012/0183712 A1 | 7/2012 | Leonhard et al. | |
| 2013/0045371 A1 | 2/2013 | O'Donnell | |
| 2013/0209718 A1 | 8/2013 | Wen | |
| 2013/0316112 A1 | 11/2013 | Leonhard et al. | |
| 2015/0309609 A1 | 10/2015 | Wilson et al. | |
| 2017/0031525 A1 | 2/2017 | Wilson et al. | |
| 2017/0147100 A1 | 5/2017 | Wilson et al. | |
| 2017/0160828 A1* | 6/2017 | Leonhard | G06F 1/1637 |

FOREIGN PATENT DOCUMENTS

| | | |
|---|---|---|
| CN | 201397689 Y | 2/2010 |
| DE | 19808535 A1 | 2/1999 |
| EP | 1548691 A1 | 4/2004 |
| EP | 1471415 A2 | 10/2004 |
| EP | 2031030 A1 | 3/2009 |
| GB | 2449899 A | 10/2008 |
| JP | 2002328613 A | 11/2002 |
| TW | 200700793 A | 1/2007 |
| TW | 343359 U | 10/2008 |
| TW | 201027992 A1 | 7/2010 |
| TW | 386524 U | 8/2010 |
| TW | 400596 U | 3/2011 |
| WO | 97/008260 A1 | 3/1997 |
| WO | 03052678 A1 | 6/2003 |

OTHER PUBLICATIONS

Third Party Observation; Received by the UK Patent Office Dec. 24, 2012; UK Patent Application No. GB1200651.6.
Office Action dated Aug. 18, 2015 in U.S. Appl. No. 13/352,196.
Office Action, dated Feb. 20, 2014; Canada Application 2,760,341.
Jake Gaecke, "Appletell reviews the iVisor AF for iPad", Sep. 15, 2010 (Sep. 15, 2010), available online at http://technologyrell.com/apple/60407/appletell-reviews-ivisor-ag-for-ipad, last visited Dec. 17, 2014.
Office Action dated Jun. 25, 2014 in U.S. Appl. No. 12/780,443.
Petition for Inter Partes Review of U.S. Pat. No. 8,044,942; Filed Nov. 23, 2015.
Exhibit 1080;Declartion of Dr. Mark Ross; U.S. Pat. No. 8,044,942.
Exhibit 1005 iVisor for MacBook ("iVisor").
Notice of Filing Date Accorded to Petition and Time for Filing Patent Owner Preliminary Response; dated Nov. 30, 2015.
IPR2016-00231—Power of Attorney, filed Nov. 23, 2015.
IPR2016-00231—Petition for Inter Partes Review, filed Nov. 23, 2015.
IPR2016-00231—Notice of Filing Date Accorded to Petition and Time for Filing Patent Owner Preliminary Response, filed Nov. 30, 2015.
IPR2016-00231—Patent Owner's Mandatory Notice, filed Dec. 14, 2015.
IPR2016-00231—Patent Owner's Preliminary Response, filed Feb. 29, 2016.
IPR2016-00231—Decision, Denying Institution of Inter Partes Review, issued May 18, 2016.
IPR2016-00231—Patent Owner's Updated Mandatory Notice, filed May 18, 2016.

(56) References Cited

OTHER PUBLICATIONS

IPR2016-00231—Petitioner's Request for Rehearing, filed Jun. 15, 2016.
IPR2016-00231—Exhibit 1002—Patent Prosecution History, filed Nov. 23, 2015.
IPR2016-00231—Exhibit 1005—"Moshi ivisor Anti-Refelctive Screen Protector for Macbook 15-inch Unibody", "Amazon.com: Moshi ivisor Anti-Reflective Screen Protector for Macbook 15-inch UnibodyElectronics", filed Nov. 23, 2015.
IPR2016-00231—Exhibit 1011—Aevoe Appeal Brief, U.S. Appl. No. 14/078,245, filed Nov. 23, 2015.
IPR2016-00231—Exhibit 1015—Examiner's Answer to Appeal Brief and Final Rejection, U.S. Appl. No. 14/078,245, filed Nov. 23, 2015.
IPR2016-00231—Exhibit 1016—Inter Partes Reexamination Certificate, Reexamination No. 95/002,073, filed Nov. 23, 2015.
IPR2016-00231—Exhibit 1017—Notice of Acceptance of Power of Attorney, Reexamination No. 95/001,881, filed Nov. 23, 2015.
IPR2016-00231—Exhibit 1018—Declaration of Dr. Mark Ross, filed Nov. 23, 2015.
IPR2016-00231—Exhibit 1019—Declaration of Vivek Ganti, filed Nov. 23, 2015.
IPR2016-00231—Exhibit 2001—Joint Claim Construction and Prehearing Statement; Case No. 2:15-cv-00149-RFB-CWH, filed Feb. 29, 2016.
IPR2016-00231—Exhibit 2002—Opening Claim Construction Brief; Case No. 2:15-cv-00149-RFB-CWH, filed Feb. 29, 2016.
IPR2016-00231—Exhibit 2003—Order; Case No. 2:15-cv-00149-RFB-CWH, filed Feb. 29, 2016.
IPR2016-00231—Exhibit 2004—Patent Prosecution History, U.S. Appl. No. 13/352,196, filed Feb. 29, 2016.
IPR2016-00231—Exhibit 2005—Patent Prosecution History, U.S. Appl. No. 13/411,372, filed Feb. 29, 2016.
IPR2016-00231—Exhibit 2006—Patent Prosecution History, U.S. Appl. No. 14/078,245, filed Feb. 29, 2016.
IPR2016-00231—Exhibit 2007—Patent Prosecution History, U.S. Appl. No. 13/838,311, filed Feb. 29, 2016.
IPR2016-00231—Exhibit 2008—Touch Technology Brief, "Technology Comparison: Resistive and Surface Capacitive"; 3M and MicroTouch System, filed Feb. 29, 2016.
IPR2016-00231—Exhibit 2010—Raymond A. Serway and John W. Jewett, Jr.;Physics for Scientists and Engineers with Modern Physics, Cengage Learning, Boston, MA; pp. 1144-1145, 2-9, filed Feb. 29, 2016.
IPR2016-00231—Exhibit 2011—"Selling at Amazon.com", Editing Product Pages; http://amazon.com/gp/help/customer/display.html?nodeId=200202090, filed Feb. 29, 2016.
IPR2016-00231—Decision, Denying Petitioner's Request for Rehearing, issued Jul. 25, 2016.
IPR2016-00231—Exhibit 1009—Michael Leonhard, "Email Correspondence", Aevoe IB00006229, filed Nov. 23, 2015.
IPR2016-00231—Exhibit 1010—Michael Leonhard, "Email Correspondence", Aevoe IB00006258, filed Nov. 23, 2015.
IPR2016-00231—Exhibit 1004—Masaaki Kitaguchi, Cover Sheet for Display Screen (Hyoji Gamen Yo Kabaa Shiito), pp. 17, Application No. 2001131384; Publication Country Japan, filed Nov. 23, 2015.
Amazon.com: moshi iVisor AG 13, Anti-Glare Screen Protector for Macbook 13" Unibody: Electronics; http://www.amazon.com/iVisor-Anti-Glare-Protector-Macbook-Unibody/dp/b0029TSTT4[Apr. 27, 2012 9:45:24 AM (Submitted as Exhibit 4).
Amazon.com Ad, 2 Pack Moshi iVisor AG Anti-Glare Screen Protector for Apple iPhone 4 & iPhone 4S (White) + MicroFiber Cleaning Cloth; available at http://www.amazon.com/Moshi-Anti-Glare-Protector-MicroFiber-Cleaning/dp/B0063GAH9Y.
AppleInsider: Up close and personal with Apple's MacBook (photos); by AppleInsider Staff Published 11:00 AM EST (8:00 AM PST) May 16, 2006 (Submitted as Exhibit 2).
"GGS Optical Glass LCD Screen Protector 3.0" for Sony Cybershot DSC HX1 H10 H2O W230 W290 N1 N2 T100 amazon.com http://www.amazon.com/Optical-Glass-Screen-Protector/dp/B003ZEXG68.
"Giottos SP 8270 Aegis Multi-coated LCD Screen Protector" amazon.com http://www.amazon.com/Giottos-SP8270-Multi-coated-Screen-Protector/dp/B001940LR8.
"iVisor Matte iPad Protector with a Bubble Free Guarantee", Dec. 16, 2010 (Dec. 16, 2010), XP55013271, URL: https://www.youtube.com/watch?v=LYnRXZAL1VY.
"Moshi-Zubehor der Extraklasse ( I nk 1 iVisor AG)", Internet, Jul. 23, 2010 (Jul. 23, 2010), XP55013277, URL:http://www.rosenblut.org/2010/07/23/moshi-zubehor-der-extraklasse-inkl-ivisor-ag.
Sony PCKLM1Am Semi-Hard Plastic LCD Screen Cover Protector for NEX-3, NEX-5, SLT-A33, anf SLT-A55 Alpha camera Models amazon.com http://www.amazon.com/Sony-PCKLM1AM-Semi-Hard-Plastic-Protector/dp/B003XFGIKA.
The Ultimate MacBook Pro Protection Suite by Moshi by David Klein, Jul. 7, 2009; http://gigaom.com/apple/the-ultimate-macbook-pro-protection-suite-by-moshi/ (retrieved Jan. 26, 2012).
"What Makes NuShield Screen Protectors Superior" nushield.com http://www.nushield.com/technology.php.

\* cited by examiner

TOUCH SCREEN PROTECTOR

This application is a continuation of application Ser. No. 13/352,196 filed Jan. 17, 2012, which is a continuation-in-part of International application PCT/US2011/051344 filed Sep. 13, 2011, which is a continuation of application Ser. No. 13/160,404 filed Jun. 14, 2011, now U.S. Pat. No. 8,044,942, and which claims the benefit of provisional application 61/433,789, filed Jan. 18, 2011. The entire content of each prior filed application is expressly incorporated herein by reference.

FIELD OF THE INVENTION

The invention relates to a touch screen protector. In particular, it relates to a touch screen protector that can be easily attached and removed from a hand held electronic device that includes and is operable by a touch screen.

BACKGROUND OF THE INVENTION

With the ever increasing popularity of the touch screen hand held electronic devices came the demand for effective touch screen protectors. While the beautiful and glossy screen of touch screen hand held electronic devices such as iPad device looks great, in actual use, the amount of fingerprints left behind significantly damages the appearance and display quality of the screen. For this reason, the device is sold with a screen cleaning cloth. As frequent cleaning is not desirable, various screen protecting devices have been suggested.

Several kinds of touch screen protector are currently available. The ZAGG INVISIBLESHIELD™ product is a glare reduction touch screen protector. Its major drawback is the difficulty to apply the protector to a hand held device. The anti-glare INCIPIO™ screen protector of traps dust particles and bubbles even after meticulous cleaning and application. Other touch screen protectors currently available in the market are also unsatisfactory to the consumers, as a result of their tendency to trap air bubbles and dust, even with careful application. When in use, these touch screen protectors are in direct physical contact with the touch screen of the electronic device, either by static or application of adhesives. In the latter scenario, when the screen protectors are removed, diligent cleaning is needed to restore the touch screen to its shining luster. JP 2002328613 relates to a cover sheet comprising a transparent plastic film to protect a display screen, said cover sheet having a spacer comprising countless dots on a surface opposite the aforesaid display screen. U.S. Pat. No. 7,070,837 relates to a plastic film screen protector having a slightly roughened surface so that the majority of the film facing an electronic device screen does not substantially touch the screen. As a result, the roughened surface of the protector prevents interference patterns from arising when the film touches the screen.

None of these prior art devices has been found to be completely suitable, such that there is a need in the industry for a touch screen protector that is able to be installed easily and quickly without problems of trapping air bubbles or dust. The touch screen protector of the present invention now satisfies this need.

SUMMARY OF THE INVENTION

The invention relates to a touch screen protector for a hand held electronic device having a front face that includes a touch screen portion and a non-functional band along the outer perimeter of the front face. The protector comprises a plastic film and a spacer provided along the outer perimeter of the plastic film surrounding a transparent window that corresponds in size to the touch screen portion. In one embodiment of the present invention, the plastic film has front and back sides, an outer perimeter that corresponds to that of the front face of the device, and a transparent window which is continuously surrounded by the spacer. Preferably, the spacer has a thickness sufficient to space the plastic film near but not in contact with the touch screen portion. In one preferred embodiment, the spacer has an exposed adhesive along its outer perimeter for removably mounting the protector upon the non-functional band of the front face of the device to form an enclosed air space between the transparent window of the plastic film, the spacer and the touch screen portion of the device. The transparent window of the touch screen protector of the invention can be pressed against the touch screen portion for operation of the electronic device while preventing direct contact of a user's fingers with the touch screen portion and without producing visible interference patterns during use. The spacer has a thickness that is less than that of the plastic film and generally is between about 0.05 and about 1 mm.

The exposed adhesive typically has an adhesive strength of 5-50 grams which is sufficient to releasably mount the protector (10) onto the device but which enables its removal without leaving adhesive residue on the touch screen portion. One of the spacer (40) or plastic film (30) includes a joining adhesive for adhering together the spacer (40) and the plastic film (30). The joining adhesive is located either on the surface of the spacer that does not include the exposed adhesive or on the back side of the plastic film (30) adjacent the spacer (40). The joining adhesive has an adhesive strength that is at least 5 times and preferably is at least 10 times stronger than that of the exposed adhesive so that the spacer is not removed from the plastic film (30) when the protector is removed from the touch screen portion of the front face of the device. Typically, the joining adhesive has an adhesive strength of between 200-2000 grams.

Advantageously, the plastic film includes micro-particles adhered at least to the front side of the transparent window in an amount effective for providing anti-glare and anti-static effects to the protector. Preferably, micro-particles are also present on the back side of the plastic film at a density which is sufficiently high to provide an anti-static effect without adversely affecting the quality of images viewed through the window. Advantageously, micro-particles are also provided on the back side of the plastic film to prevent interference patterns from arising when the plastic film touches the touch screen portion of the device. For this purpose, the micro-particles cover more than 5% up to 50% of the back side of the plastic film (30). Also, the micro-particles are preferably transparent.

In a preferred embodiment, the width of the spacer is selected to conform to or be within the non-functional band of the front face of the device so that the spacer does not interfere with the use of the touch screen portion when the protector is adhesively mounted onto the device.

In another preferred embodiment, the joining adhesive is present as an adhesive strip that joins the spacer (40) to the plastic film (30). For this embodiment, the adhesive strip is preferably present on the spacer (40) on the surface opposite that which contains the exposed adhesive. The spacer itself or this adhesive strip may be opaque to provide the border of the plastic film that surrounds the touch screen portion of the front face of the device. The plastic film has a thickness of between 0.1 and 2 mm and may include an opaque band about its periphery that receives the adhesive or the opaque adhesive strip. More preferably, the spacer comprises at least two strips; a first strip adhesively mounted upon the perimeter of the plastic film and a second strip adhesively mounted upon the first strip whereas the second strip supports the exposed adhesive. The thickness of each strip is 0.05 to 0.5 mm, preferably 0.07 to 0.18 mm.

More preferably, the at least two strips are joined by a joining adhesive that securely holds the strips together and onto the plastic film. This adhesive is one that has stronger adhesiveness than the exposed adhesive which attaches the protector to the device. The exposed adhesive has sufficient adhesiveness to mount the protector onto the device but enables its removal without leaving adhesive residue on the device. As described herein, the joining adhesive has an adhesive strength that is at least 5 times and is preferably at least 10 times stronger than that of the exposed adhesive.

In yet another preferred embodiment, the touch screen protector of the invention further comprises a backing member to protect the back side of the plastic film and the exposed adhesive of the spacer prior to use. Preferably, the backing member further includes a tab to assist in removal of the backing member when mounting the protector on the device.

In yet another preferred embodiment of the invention, the touch screen protector further comprises one or more alignment holes that match one or more buttons on the electronic device to facilitate mounting of the protector on the device.

Preferably, the touch screen portion of the device and the plastic film of the touch screen protector are each substantially rectangular and the touch screen is part of a telephone, reading device, music device, viewing device or navigation device such as iPhone, Nook, iPod, iPad, Droid, and GPS navigator.

The transparent window of the touch screen protector can be clear or can have a coating that provides a matte effect or a privacy screen feature.

DETAILED DESCRIPTION OF THE INVENTION

Figure 1A:
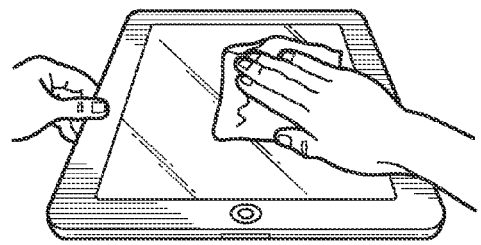
FIGS. 1A-D are schematic diagrams of assembling a touch screen protector of the invention with an iPad device.

The following definitions are used in this disclosure:

The term "near" as used herein means close in distance but not in physical contact, preferably about or less than 1 mm apart.

The term "periphery" as used herein means the outermost part or region within a precise boundary.

The term "non-functional band" as used herein means the area that surrounding the touch screen portion of the hand held electronic device which is made of a different material or made of the same material as the touch screen portion but is not touch sensitive.

The term "front face" of the device refers to the exposed surface of the device. The touch screen is generally made of a single glass sheet that includes the exposed surface for both the operable touch screen portion and the non-functional band around the perimeter of the touch screen portion.

The term "matte" as used herein means a surface finish which reflects back only a small portion of the incident light shined upon it.

The term "anti-static" is used to mean that the plastic film does not generate static electricity when contacted or rubbed by the user.

The invention relates to a novel touch screen protector including a plastic film and a spacer provided along the outer perimeter of the plastic film. Unlike most of the prior art touch screen protectors which are in direct physical contact with the touch screen, the touch screen protector of the present invention does not touch the operable portion of the touch screen. Such portion is referred to herein as the "touch screen portion." This critical feature of the present invention makes it possible for the screen protector to be 100% bubble free.

Although varying from device to device, the distance between the touch screen protector and the touch screen portion of the hand held device is determined by the thickness of the spacer, which is less than that of the plastic film. In a preferred embodiment, the spacer of the present invention has a thickness that is less than that of the plastic film and is between about 0.05 and about 1 mm, and preferably about 0.05 to about 0.15 mm. The spacing can be as small as possible provided that the protector is not in contact with the touch screen portion when the device is not in use. The stiffness of the plastic film contributes to the desired spacing as the stiffer the plastic is, the closer the spacing can be. In contrast, the plastic film should not be so stiff as to hinder the user's ability to operate the touch screen portion. The preferred dimensions and properties disclosed herein achieve these features.

The plastic film has front and back sides, an outer perimeter that corresponds to that of the device, and a transparent window. The light transmission of the transparent window is preferably 60%, more preferably 75%, and most preferably 85%. In one preferred embodiment, the plastic film has a thickness of between about 0.15 and about 2 mm and includes an opaque band about its periphery.

The plastic film is sufficiently hard or stiff so that it does not bend or collapse under its own weight to contact the touch screen portion when the protector is applied onto the handheld device and the device is placed horizontally on a flat surface. Preferably, the hardness of the plastic film is more than 1H, as assayed by Pencil Harness Test. More preferably, the hardness of the plastic film is more than 2 H. Most preferably, the hardness of the plastic film is more than 3 H. The plastic film is also sufficiently thin to be elastic so that, to operate the touch screen portion, all that is necessary is a gentle force from a user's finger to press any point of the transparent window of the plastic film against the touch screen portion of the hand held device. The plastic film can be made of any suitable transparent material available. Preferably, the plastic film is made of polyethylene terephthalate (PET).

The protector achieves the desired spacing without providing irregularities, bumps or other non-uniformities on the back side of the plastic film. The film instead is essentially smooth and utilizes coatings of micro-particles to achieve improved performance compared to the touch screen protectors of the art.

In one embodiment, the plastic film is coated to have a "matte" or anti-glare effect. Surface treatment such as EZ-GLIDE™ surface treatment further allows better touch screen portion maneuverability and effectively reduces finger glide friction on the touch screen portion of the hand held device. Specifically, the EZ-GLIDE™ surface treatment is a technology in which the front side of the screen protector, i.e., the side that contacts the hand, is provided with micro-particles that reduce static effects and allows the hand to move smoothly on the front side of the screen protector.

While prior film products that were to be handled by users may have been considered to require a treatment to reduce electrostatic charges due to rubbing contact, the present invention is at least partly based on the discovery that the provision of an EZ-GLIDE™ micro-particle surface treatment on the back side of the plastic film, i.e., the side of the film facing the touch screen portion, prevents or avoids the generation of interference patterns (or Newton-rings) when the protector is pressed against the touch screen portion by the user's finger or fingers. In addition to this desirable anti-Newton ring effect, the EZ-GLIDE™ micro-particle surface treatment on the back side of the plastic film also prevents or avoids producing static electricity effects between the screen protector and the touch screen portion.

The micro-particles are not in physical contact with the touch screen portion unless the screen protector is pressed against the touch screen portion. As a result of the anti-static effects of the micro-particles, the screen protector will quickly bounce back or pull away from the touch screen portion once it is no longer pressed against it. The micro-particles on the back side of the plastic film can be of various shapes, such as the column shape and the wave shape. The density of micro-particles are optimized such that they are high enough for providing anti-static effects but not too high as to adversely affect the quality of images that are viewed through the window. Preferably, the micro-particles cover more than 5% of the film. More preferably, the micro particles cover more than 8% of the film. Most preferably, the micro-particles cover more than 10% of the film. If desired, the entire film of the protector can be covered with micro-particles, but good results can also be achieved if only up to 50% of the entire film is covered. The micro-particles can be made of any transparent material commonly known in the art. Preferably, the micro-particles are made of PET so that they are compatible with the film material. It is most preferable for the film of the screen protector of the present invention to include micro-particles on both sides so that both the front and back surfaces of the film do not generate static electricity during use.

The touch screen of most electronic devices has a non-functional band, which creates a perimeter border. The screen protector of the present invention is designed so that the spacer can adhere to this border such that the transparent window enables the full operative portion of the touch screen portion to be used. The opaque band on the plastic film more or less corresponds to the non-functional band of the front face of the device. This is a useful advantage when manufacturing the product, as a separate pigmenting or coloring step on the film is not needed. To assure that the operative touch screen portion is not hindered, the spacer has a thickness that is less than that of the border wherever possible. To do this, the spacer has a width that is 1 to 2 mm less than that of the opaque band. Thus, when the spacer is properly applied along the outer perimeter onto the back side of the plastic film, it surrounds the transparent window but does not touch the latter, thus facilitating proper operation of the touch screen portion.

For devices that have non-functional boundaries that are not uniform, e.g., the iPod Touch, the spacer of the protector can be configured in the same manner. It is also possible, although not preferred, to include the spacer only upon a portion of the perimeter, such as on top and bottom of a rectangular protector when the side boundaries of the touch screen are very small so that the protector can be mounted on the device without blocking or interfering with the functional touch screen portion of the device.

When the touch screen of the device has a non-functional band about its perimeter, the width of the spacer is preferably selected to conform to the width of the band so that the spacer does not interfere with the use of the touch screen portion when the protector is adhesively mounted onto the device. The spacer has a thickness sufficient to space the plastic film near but not in contact with the touch screen portion. The spacer also has an exposed adhesive for removably mounting the protector upon the outer perimeter of the touch screen to form an enclosed air space between the transparent window of the plastic film, the spacer and the touch screen portion of the device. The exposed adhesive has sufficient adhesiveness to mount the protector onto the device but enables its removal without leaving adhesive residue on the device. Preferably, the exposed adhesive has an adhesive strength of 5-50 grams. Various adhesives of this type are commercially available and a skilled artisan can select the particular adhesive for the specific application of the protector to any particular device. An adhesive that allows for repeated cleaning and re-application is preferred so that the screen protector can be washed and reapplied repeatedly. Any commercial available washable and reusable adhesives can be used, such as adhesives made of silica, acrylics and polyurethane (PU).

As noted, the spacer preferably includes at least one opaque adhesive strip that is applied onto the back side of the plastic film, preferably received by the opaque band of the plastic film. In addition, the spacer may include at least two strips with the first strip adhesively mounted upon the perimeter of the plastic film and the second strip adhesively mounted upon the first strip whereas the second strip supports the exposed adhesive. The adhesive that is used to mount the spacer to the plastic film and the adhesive that is used to mount the first and second strips together could be any commercially available adhesives for joining plastic films together. Preferably, these adhesives have an adhesive strength of 200-2000 grams, which adhesive strength is at least 5 times and preferably is at least 10 times stronger than that of the exposed adhesive which attaches the protector to the device because the spacer is not intended to be removed from the plastic film. This assures that the spacer is removed together with the film when the latter is removed from the screen as the spacer is held upon the film with a greater strength than the spacer is held on the screen. The provision of an inner strip that can contain the stronger adhesive on both sides while the outer strip contains the weaker adhesive that eventually contacts the touch screen on one side facilitates the manufacture of the protection device.

Preferably, the touch screen protector of the invention also comprises a backing member to protect the back side of the plastic film and the exposed adhesive of the spacer. The backing member may further include a tab to assist in the removal of the backing member when mounting the protector. By grasping and pulling on the tab, the backing member is easily removed from the protector to enable it to be mounted upon the device by contact of the exposed adhesive to the non-functional border of the touch screen of the device.

As many of these types of electronic devices includes one or more operational buttons on the touch screen operative portion or border for performing functions such as on-offswitching between internet browsers, photos, music or e-mail, the touch screen protector of the invention may further comprise one or more holes that match the one or more buttons on the electronic device. In addition to exposing the buttons for ease of operation, these holes act as alignment features to facilitate proper mounting of the plastic film on the touch screen.

Although the touch screen protector can be of any shape, they are preferably substantially rectangular to conform to the shape of current handheld devices, and most of those devices have a substantially rectangular shape. In particular, the shape of the protector is not exactly rectangular as the corners are rounded to match those of the devices. Thus, the touch screen protector can be used to protect touch screens of many different kinds of handheld electronic devices, such as a mobile telephone, reading device, music device, viewing device or navigation device. Examples of such devices are iPhone, Nook, iPod, iPad, Droid, and GPS navigation systems. The nature of the protector and its design enable specific embodiments to be adapted to conform to the touch screen of any such device.

The touch screen protector of the present invention has the advantage of being able to be installed easily and quickly, e.g., within 30 seconds or less. Because the installation process is so quick, when properly applied, no dust will be trapped in between the touch screen portion of the hand held electronic device and the touch screen protector. As the touch screen protector of the present invention is to be gently applied to the non-functional border that typically surrounds the touch screen portion of a hand held device, there is no concern for leaving glue traces on the touch screen portion. Thus, the touch screen protector of the invention can be easily and readily removed without any adverse effect on the appearance and display quality of the touch screen portion of the hand held device.

Advantageously, when the hand held device is protected by the touch screen protector of the invention, there are no fingerprint smudges on the touch screen portion, no decrease in the quality of the display, and no decrease in the touch response of the screen. It would even allow the use of a capacitive stylus when using art applications on the hand held device.

In addition, the touch screen protector of the present invention also reduces the glare of a glossy touch screen portion. As a result, the photos on the touch screen portion look like prints. There is virtually no effect on the crispness of the touch screen portion even though the glare is completely removed. Owing to the absolute finger print resistance feature of the touch screen protector of the present invention, it completely resolves the issue of smudge of the touch screen portion.

EXAMPLES

Example 1: Protecting an iPad

Figure 1B:
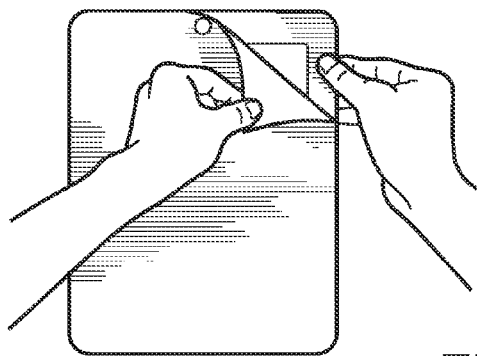
Figure 1C:
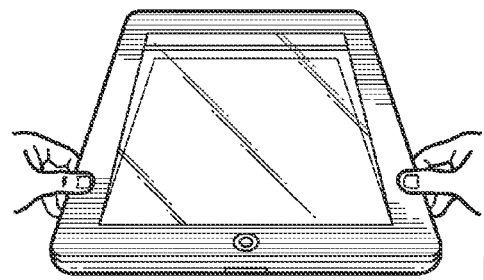
Figure 1D:
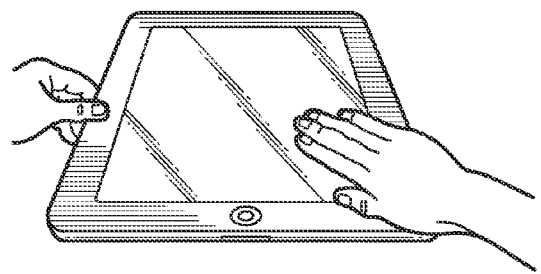

The protector of the invention may be made for use with Apple's iPad as an anti-reflective screen protector specifically designed to protect iPad's touch screen while reducing fingerprint smudging. The protector can be installed in seconds without any air bubbles, unlike other screen protectors that require tedious installation procedures and often result in unwanted air bubbles or hinder touch screen performance. As shown in the schematic diagrams of FIGS. 1A-D, the installation procedure is as follows. First, the screen of the iPad is cleaned by using the microfiber cloth included in the package to wipe away any dust particles on the iPad screen (FIG. 1A). Second, the backing member is peeled off gently before applying the plastic film to the non-functional boundary of the iPad screen (FIG. 1B). Third, the protector is aligned starting at the bottom, with the circular opening of the protector placed over iPad's "home" button (FIG. 1C). Finally, gentle pressure is applied around the borders of the protector so that it is secured in place on the iPad (FIG. 1D).

Figure 2:
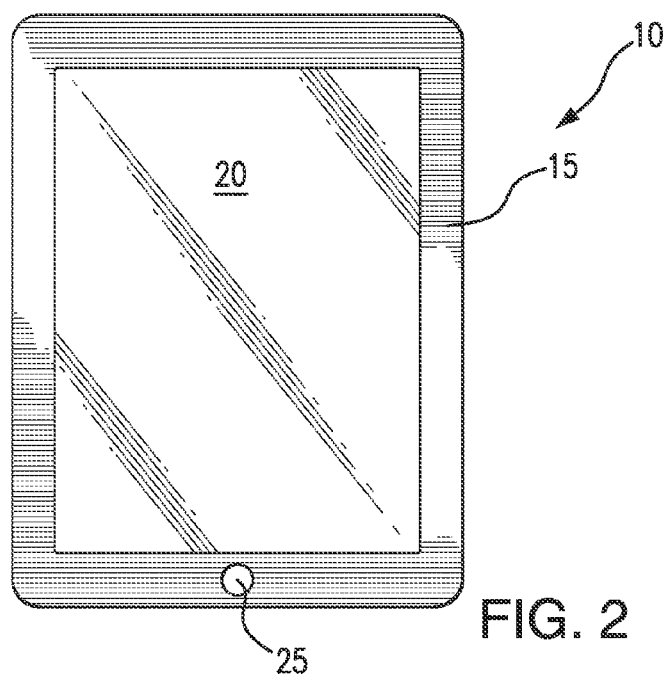
FIG. 2 is a front view of the touch screen protector of FIG. 1.
Figure 3:
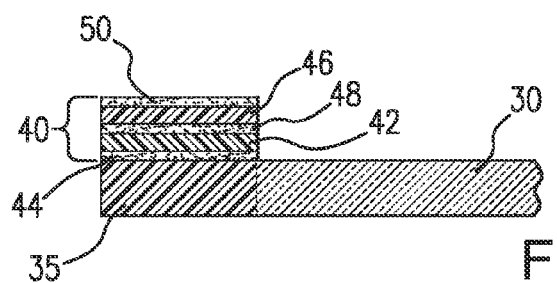
FIG. 3 is an expanded partial sectional view of the touch screen protector of FIG. 2 to illustrate the spacer.
Figure 4:
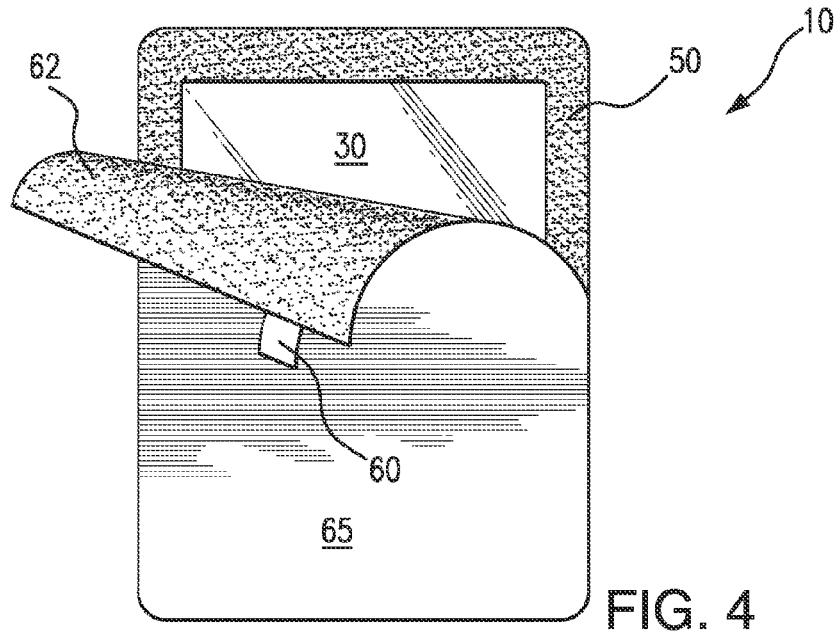
FIG. 4 is a back view of the touch screen protector with a portion of the backing member removed.

Further details of the protector and its construction are shown in FIGS. 2 to 4. As shown in FIG. 2, the protector 10 is generally rectangular and has an opaque band 15 around its perimeter. The band essentially conforms to the non-functional band that surrounds the touch screen of the iPad, while the transparent window 20 corresponds to the functional portion of the touch screen of the iPad. The protector includes a hole 25 that corresponds to the on-off selector button of the iPad. The spacer is on the back side of the plastic film and is not visible due to the presence of the opaque band.

FIG. 3 is an expanded cross-sectional view of the spacer. The plastic film is shown as 30 with the opaque band shown as 35. The spacer is shown as 40 and it includes the first strip 42 adhered to the plastic film 30 by adhesive 44, and the second strip 46 adhered to the first strip 42 by adhesive 48. The exposed adhesive 50 is shown on the spacer.

FIG. 4 is a view of the back side of the protector 10 as the backing member 65 is being removed for application of the protector to the iPad. As shown, tab member 60 has been pulled to detach backing member 65 from spacer 50, thus showing the inside surface 62 of the backing member and the back side of the plastic film 30 behind the transparent window as well as the exposed adhesive 50 of the spacer. The backing member 65 is completely removed before the protector 10 is applied to the iPad.

As the screen protector does not touch the touch screen portion of the iPad, it can be easily removed without leaving any residue on the touch screen portion. The adhesive also does not leave any residue on the non-functional border due to its relatively low adhesivity. The touch screen protector provide excellent touch screen portion maneuverability and scratch/smudge resistance while retaining optimal touch screen portion sensitivity and feedback.

Example 2: Protecting an iPhone 4

Another protector can be specifically adapted for Apple's iPhone 4 touch screen. The protector is sized to conform to the touch screen and is applied in a similar manner as for the iPad. First, the iPhone 4 is cleaned by using the microfiber cloth included in the package to wipe away any dust particles on the iPhone 4's screen. Second, the protector's backing member is peeled off gently before applying the plastic film to the boundaries of the iPhone touch screen. Third, the protector is properly aligned on top of the iPhone touch screen. Finally, pressure is gently applied around the borders of the protector to secure it in place. Again, the touch screen protector provides excellent touch screen portion maneuverability and scratch/smudge resistance while retaining optimal touch screen portion sensitivity and feedback.

Example 3: Plastic Films for the Touch Screen Protectors

The plastic films are made with the following specifications:

| | |
|---|---|
| Structure | HC (Matt) --- PET (188 μm) --- HC (Matt) |
| Total light transmittal | ≥89.0% |
| Haze | 10.5 ± 2.0% |
| Pencil Hardness | ≥3H |
| Steel wool abrasion test | No scratches |
| Adhesion | 0% Peel |
| Wetting tension test | ≥33 mN/m |
| Foreign matter contaminations | Diameter < 0.2 mm (ignored) |
| | Diameter ≥ 0.2 mm (≤0.5/m$^2$) |
| Scratch | None (W ≥ 0.1 mm & L ≥ 1.5 mm) |

To ensure the quality of the film, several tests such as cross cut tape test are carried out as follows:

First, cut the surface of the film with utility knife horizontally and vertically for 11 lines each to make one hundred 1 mm×1 mm squares on the film. Then, apply more than 20 mm long Nichiban Celofan Tape (Nichiban No. 405) on the cut surface and press with finger. Afterwards, pick up the tape end and remove the tape to 60° angle/0.5-1 mm to see if any coating comes off.

In both Examples 1 and 2, the protector can be removed for cleaning and re-application as necessary. The protector can be cleaned by rinsing with water and air drying. Small amounts of dishwashing detergent can be applied if necessary. Any debris or dust caught on the touch screen portion can be first brushed away. Once done rinsing, the protector is placed, adhesive side up, onto a towel and allowed to air dry. After it is completely dry and clean, it can be reapplied to the device.

What is claimed is:

1. A touch screen protector for a hand held electronic device having a front face that includes a touch screen portion and an outer perimeter:
    the touchscreen protector comprising front and back sides, an outer perimeter that corresponds to that of the device, and a transparent window that corresponds in size to the touch screen portion; and
    the touchscreen protector further comprising a spacer provided along the outer perimeter and continuously surrounding the transparent window, having a thickness sufficient to space the protector near but not in contact with the touch screen portion, and an exposed adhesive for removably mounting the protector upon the outer perimeter of the front face to form an enclosed air space between the transparent window, the spacer and the touch screen portion of the device;
    wherein the window can be pressed against the touch screen portion for operation of the electronic device while preventing direct contact of a user's fingers with the touch screen portion and without producing visible interference patterns during use,
    wherein the spacer consists only of the adhesive and optionally an opaque band, and
    wherein micro-particles are present on the back side of the protector sufficient to avoid the generation of interference patterns when the protector is pressed against the touch screen portion.

2. The touch screen protector of claim 1, wherein the spacer has a thickness that is less than that of the window and is between about 0.05 and about 1 mm.

3. The touch screen protector of claim 1, wherein the protector includes an opaque band about its periphery.

4. The touch screen protector of claim 1, wherein the protector also includes micro-particles adhered to the front side of the window in an amount effective for providing anti-glare and anti-static effects to the window.

5. The touch screen protector of claim 1, which further comprises a backing member to protect the back side of the protector and the exposed adhesive of the spacer prior to use.

6. The touch screen protector of claim 1, which further comprises one or more alignment holes that match one or more buttons on the electronic device to facilitate mounting of the protector on the device.

7. The touch screen protector of claim 1, wherein the touch screen of the device and the protector are each substantially rectangular and the touch screen is part of a telephone, reading device, music device, viewing device or navigation device.

8. The touch screen protector of claim 1, wherein the transparent window is clear but includes a coating that provides a matte effect or a privacy screen feature.

9. The touch screen protector of claim 1, wherein the micro-particles cover more than 5% up to 50% of the back side of the protector.

10. The touch screen protector of claim 1, wherein the micro-particles are formed from a transparent material that is compatible with the protector.

11. The touch screen protector of claim 10, wherein the micro-particles are formed from polyethylene terephthalate (PET).

12. A touch screen protector for a hand held electronic device having a front face that includes a touch screen portion and an outer perimeter:
    the touchscreen protector comprising front and back sides, an outer perimeter that corresponds to that of the device, and a transparent window that corresponds in size to the touch screen portion; and
    the touchscreen protector further comprising a spacer provided along the outer perimeter and continuously surrounding the transparent window, having a thickness sufficient to space the protector near but not in contact with the touch screen portion, and an exposed adhesive for removably mounting the protector upon the outer perimeter of the front face to form an enclosed air space between the transparent window, the spacer and the touch screen portion of the device;
    wherein the window can be pressed against the touch screen portion for operation of the electronic device while preventing direct contact of a user's fingers with the touch screen portion and without producing visible interference patterns during use,
    wherein the exposed adhesive has sufficient adhesiveness to mount the protector onto the device but to enable easy removal and re-application of the protector without leaving adhesive residue on the device, and
    wherein micro-particles are present on the back side of the protector sufficient to avoid the generation of interference patterns when the protector is pressed against the touch screen portion.

13. The touch screen protector of claim 12, wherein the spacer has a thickness that is less than that of the window and is between about 0.05 and about 1 mm.

14. The touch screen protector of claim 12, wherein the protector includes an opaque band about its periphery.

15. The touch screen protector of claim 12, wherein the protector also includes micro-particles adhered to the front side of the window in an amount effective for providing anti-glare and anti-static effects to the window.

16. The touch screen protector of claim 12, which further comprises a backing member to protect the back side of the protector and the exposed adhesive of the spacer prior to use.

17. The touch screen protector of claim 12, which further comprises one or more alignment holes that match one or more buttons on the electronic device to facilitate mounting of the protector on the device.

18. The touch screen protector of claim 12, wherein the touch screen of the device and the protector are each substantially rectangular and the touch screen is part of a telephone, reading device, music device, viewing device or navigation device.

19. The touch screen protector of claim 12, wherein the transparent window is clear but includes a coating that provides a matte effect or a privacy screen feature.

20. The touch screen protector of claim 12, wherein the micro-particles cover more than 5% up to 50% of the back side of the protector.

21. The touch screen protector of claim 12, wherein the micro-particles are formed from a transparent material that is compatible with the protector.

22. The touch screen protector of claim 21, wherein the micro-particles are formed from polyethylene terephthalate (PET).

* * * * *